United States Patent [19]

Bone et al.

[11] 3,953,918
[45] May 4, 1976

[54] MACHINE TOOL WITH AUTOMATIC TOOL CHANGER

[75] Inventors: Kendall Frederick Bone; Oskar Reinhold Johansson, both of Cincinnati, Ohio

[73] Assignee: Cincinnati Milacron, Inc., Cincinnati, Ohio

[22] Filed: June 25, 1975

[21] Appl. No.: 590,027

[52] U.S. Cl. .................................................. 29/568
[51] Int. Cl.² ............................................. B23Q 3/157
[58] Field of Search ....................................... 29/568

[56] References Cited
UNITED STATES PATENTS

| | | | |
|---|---|---|---|
| 3,256,600 | 6/1966 | Swanson et al. | 29/568 |
| 3,587,359 | 6/1971 | McCash et al. | 29/568 X |
| 3,691,655 | 9/1972 | Kurimoto et al. | 29/568 |
| 3,722,711 | 3/1973 | Seidel | 29/568 X |
| R26,827 | 3/1970 | Swanson et al. | 29/568 X |

*Primary Examiner*—Othell M. Simpson
*Assistant Examiner*—Z. R. Bilinsky
*Attorney, Agent, or Firm*—Jack J. Earl

[57] ABSTRACT

This disclosure is of an automatic tool changer on a machine tool which is arranged to produce movement of a tool operator about a rotary axis when the tool is used. The exchange of tools to and from the machine can be automatically accomplished without regard to the position of the tool operator in its normal range of positions. The tool operator does not return to a predetermined angular position for the tool change, but only stops for so long as the execution of that tool change.

19 Claims, 5 Drawing Figures

MACHINE TOOL WITH AUTOMATIC TOOL CHANGER

BACKGROUND

In the manufacture of complex machinery there is a need to produce parts on machine tools which have movement in more than three axes. This movement is generally in a simultaneous and coordinated mode made possible by the use of numerical control or computer direction. The usual arrangement for such a machine is with three orthogonal axes, X, Y, and Z, and one or two rotary axes, A and B. It is commonly found that this is accomplished by mounting the tool supporting spindle in a carrier which moves vertically with a saddle member (Y axis) that in turn is moved laterally and to and from the work along straight lines (X and Z axes, respectively) by its supporting structure. The spindle is supported in a yoke structure in the carrier for limited rotary motion around an A axis which is parallel to the X axis. It is common in such a machine when five axes are needed to place the B axis rotation mechanism under the workpiece support so that the workpiece rotates about the B axis which is parallel to the Y axis.

Machines such as the four and five axis configuration described have been equipped with automatic tool changers but in the execution of a tool change it has been the practice to swing the spindle about its A axis to a predetermined angular position relative to the saddle on which it is supported prior to the tool change. This then makes a tool change possible by fairly conventional mechanisms such as are known to be employed on less complex three axis machines. After the tool exchange the spindle is moved to the proper angular position to resume work.

Execution of the exchange of tools as described results in several disadvantages which have not previously been eliminated. The rotary motion of the spindle to the change position consumes substantial time and its return to a working angle thereafter compounds this problem with the result that there is an undesirable amount of time spent at each occurrence of a tool exchange.

Often the spindle must return with its new tool to the same angular position to complete machining of a particular angular surface thereon. The angular repeatability of the machine in this case must be exceptional and is very difficult to obtain. This results in a greatly increased costs during the building of such a machine.

In order to eliminate the disadvantages resulting from the return of the spindle to a predetermined angular position of the spindle, five axis machines have been developed which support the spindle for movement in only the X, Y and Z axis while the work is supported for motion around both the A and B axes. While this shortens tool change time and eliminates the angular repeatability problem, it introduces new problems that are difficult to solve. The programming of such a machine is more difficult and the overall space required for it is increased. Also the work is more remote from the solid base of the machine since it is supported on top of a stack including the two members rotating about the A and B axes and machine rigidity problems result.

It is therefore an object of this invention to provide a machine tool with a tool changer mechanism that will move tools to and from a spindle regardless of the A axis angular position of the spindle where that rotary axis of movement is built into the spindle supporting structure.

THE DRAWINGS

Figure 1:
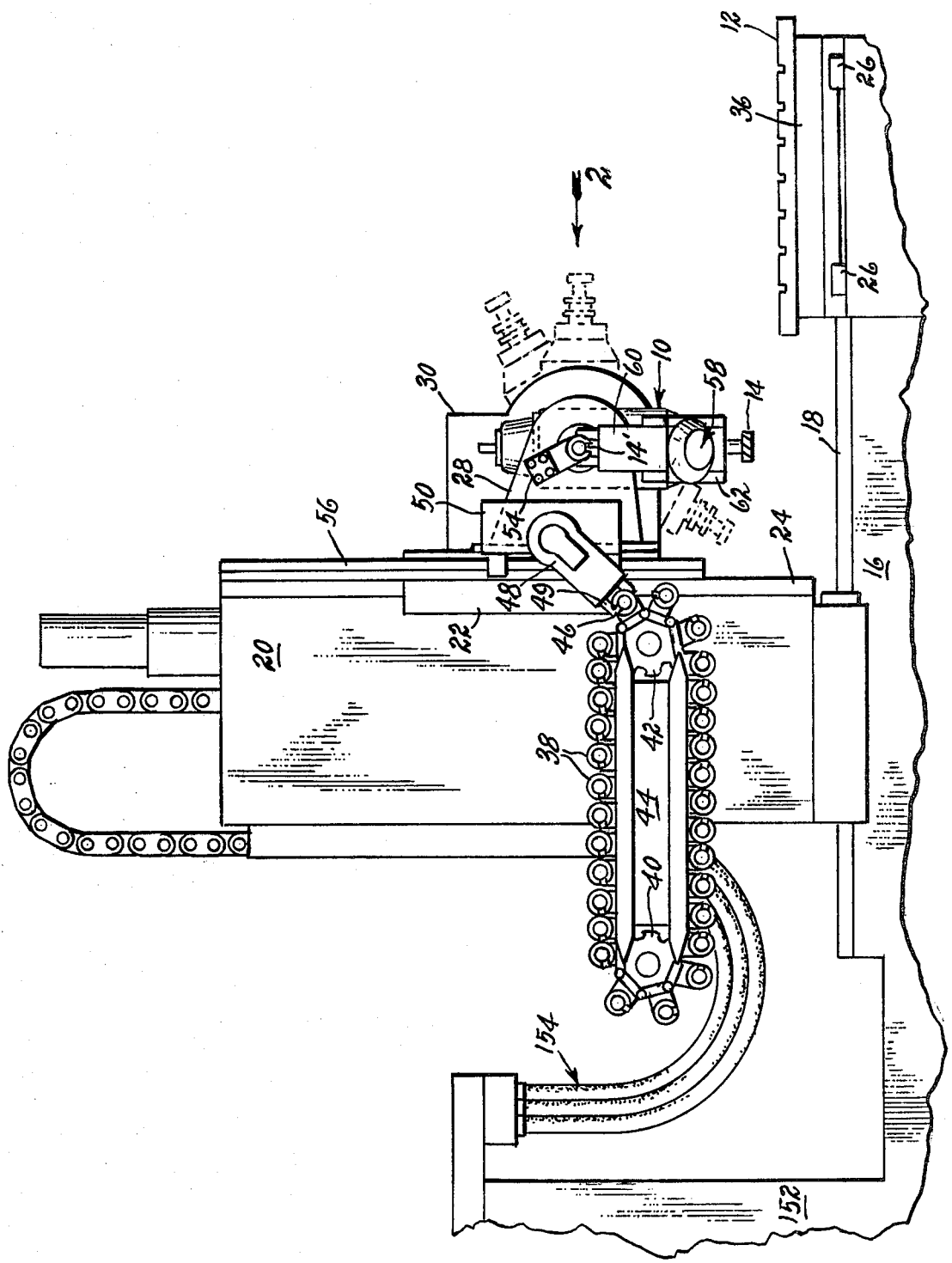
FIG. 1 is a side elevation of a multipurpose milling, drilling and boring machine.
Figure 2:
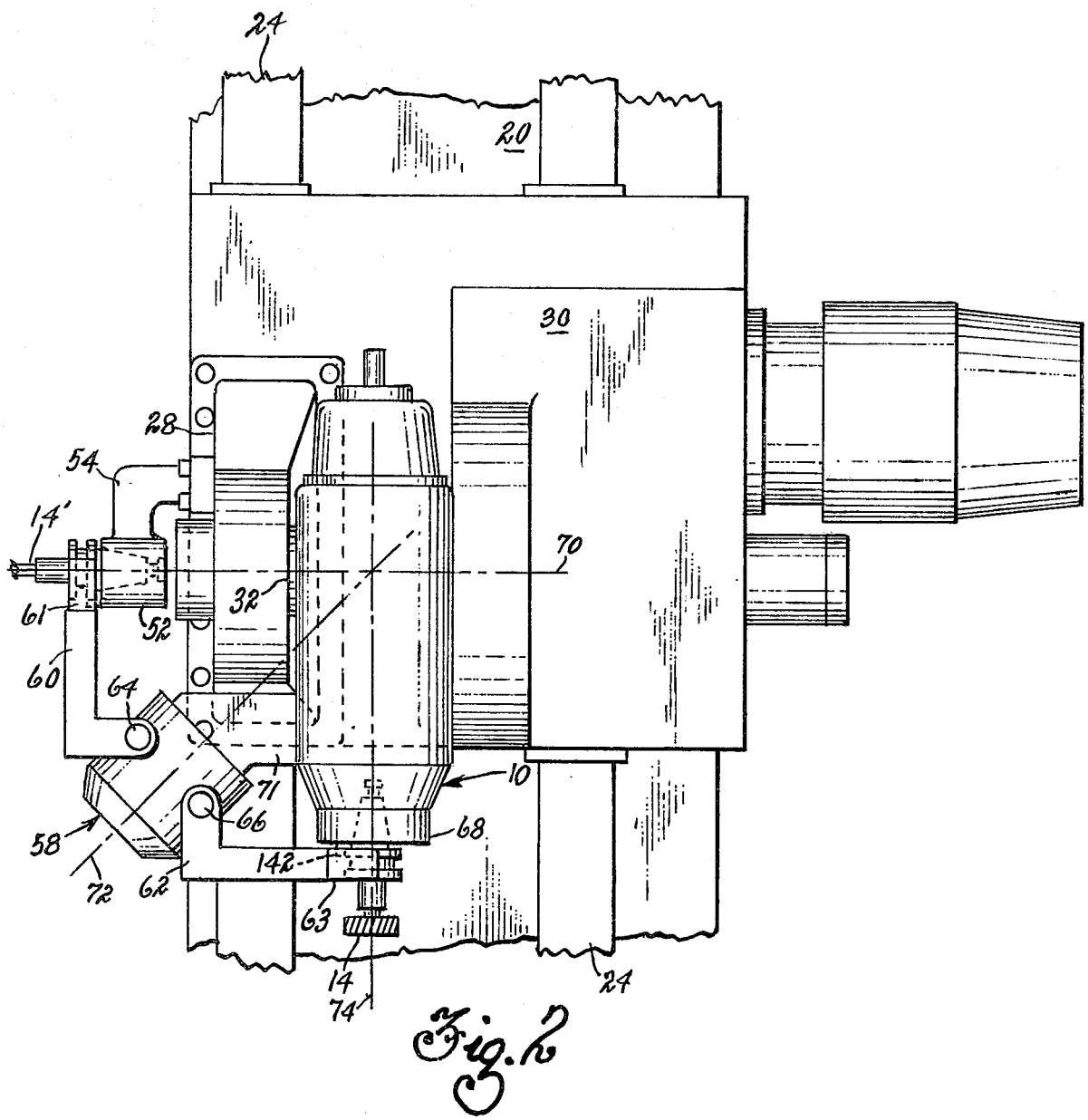
FIG. 2 is a partial front elevational view of the machine of FIG. 1.

The machine tool shown in FIGS. 1 and 2 is a multipurpose milling, drilling and boring machine which provides for movement of the spindle mechanism 10 relative to a work supporting table 12 along three orthogonal axes and about two rotary axes. The spindle mechanism 10 carries a tool 14 which is rotatably driven by the spindle mechanism during the performance of a machining operation. The machine includes a base 16 on which horizontal slide ways 18 are secured to provide a path of movement for a column 20 that is driven toward and away from the work table 12 by a conventional servo-mechanism (not shown). This movement is conventionally denoted as the Z axis movement. A machine saddle structure 22 is supported on vertical ways 24 fixed to the front of the column 20 and the saddle 22 is moving along these ways 24 also by a conventional servo-mechanism, this motion being generally reference as the Y axis movement.

The base 16 also has another set of ways 26 secured to its upper surface which are perpendicular to the Z axis ways 18. The work table 12 is supported on these ways 26 for movement there along by a conventional servo-mechanism (not shown). This relative motion transverse to the Z axis motion is usually denominated as the X axis or longitudinal motion.

In addition to the structural elements described which permit the X, Y and Z axis motions, the machine of FIGS. 1 and 2 includes provision for two additional relative tool and work support motions. The spindle mechanism 10 is carried between a bearing bracket 28 and a housing 30 fixed to and forming a part of the saddle structure 22. Trunnions 32, 34 (see FIG. 4) extend from opposite sides of the spindle mechanism and into the saddle structures 28, 30, respectively, to permit angular motion of the spindle mechanism 10. The range of angular movement of the spindle mechanism 10 is indicated by the phantom positions of the spindle mechanism 10. This motion is usually termed the A axis motion. The second relative angular motion between the work table 12 and the tool 14 in the spindle is provided by rotatably supporting the table 12 in an intermediate member 36 that rests on the X axis ways 26. This is the B axis motion and is, like all other of the described relative motions, controlled by a servo-mechanism (not shown).

The machine described is equipped with an automatic tool changing mechanism. This includes a storage magazine comprised of a chain of storage cells 38 supported on sprockets 40, 42 that are rotatably mounted on opposite ends of a bracket 44 fixed to the column 20. The sprocket 42 is selectively rotatable to position each of the cells 38 at a tool delivery location 46 where a tool supported therein may be grasped by an intermediate transport arm and hand mechanism 48, 49 that is supported on a carrier 50. The arm 48 and its gripper mechanism 49 is angularly movable to swing about its end opposite the delivery location 46 and is also movable to and from the carrier 50 along the axis of the pivot of the arm 48. By its selective operation the arm 48 and its gripper 49 are useful to grasp and withdraw a tool held in the cell 38 at the delivery location 46 and to transport it through space and to insert it in a receptacle 52 that is part of a bracket 54 fixed onto the side of the saddle structure 28. The receptacle 52 forms a tool pick-up station that varies in spatial location relative to the delivery location 46 as the saddle 22 is moved along the ways 24 but remains fixed relative to the saddle. To accommodate the varying relative position of the delivery location and receptacle 52, the carrier 50 is supported for vertical movement on ways 56 that are fixed on the side of the column 20. The carrier 50 is movable along the ways between the predetermined position shown where the arm 48 is in position to engage a tool in the location 46 and any other position dependent upon location of the saddle 30 where the arm 48 is operable to insert or withdraw a tool from the receptacle 52. Conventional limit switch logic circuits, now shown, can be used to control this movement.

As shown best in FIG. 2, a tool change mechanism 58 is fixed on the side of the spindle mechanism 10 and this mechanism includes two arms 60, 62 each having a tool gripper 61, 63 and supported for rotation on pins 64, 66, respectively, such that motion in one direction of each withdraws tools 14, 14' from the receptacle 52 and the spindle nose 68, this latter being a tool operating station and the former the tool pick-up station. The tools 14, 14' can be swung from positions adjacent the receptacle 52 and spindle nose 68 by operation of the mechanism 58 to swing the arms 60, 62 through 180° on the axis 72. The arms 60, 62 can be reversely swung on pins 64, 66 to insert the tools 14, 14' in the spindle nose 68 and receptacle 52. A specific changer mechanism of this general configuration is described in U.S. Pat. No. 3,722,711 issued to W. B. Seidel. This tool change mechanism can be operated to transport tools between the pick-up station receptacle 52 and the tool operator spindle nose 68.

Figure 4:
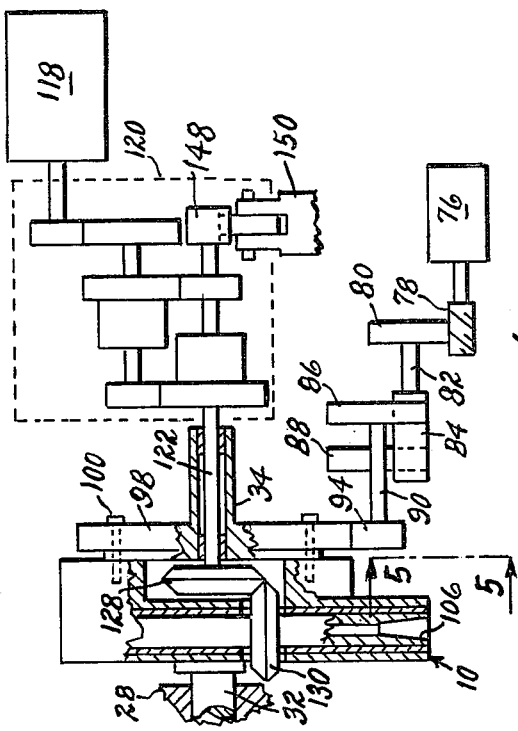
FIG. 4 is a schematic showing of the spindle rotary drive mechanism and angular position control mechanism for the spindle of the machine of FIGS. 1 and 2.
Figure 3:
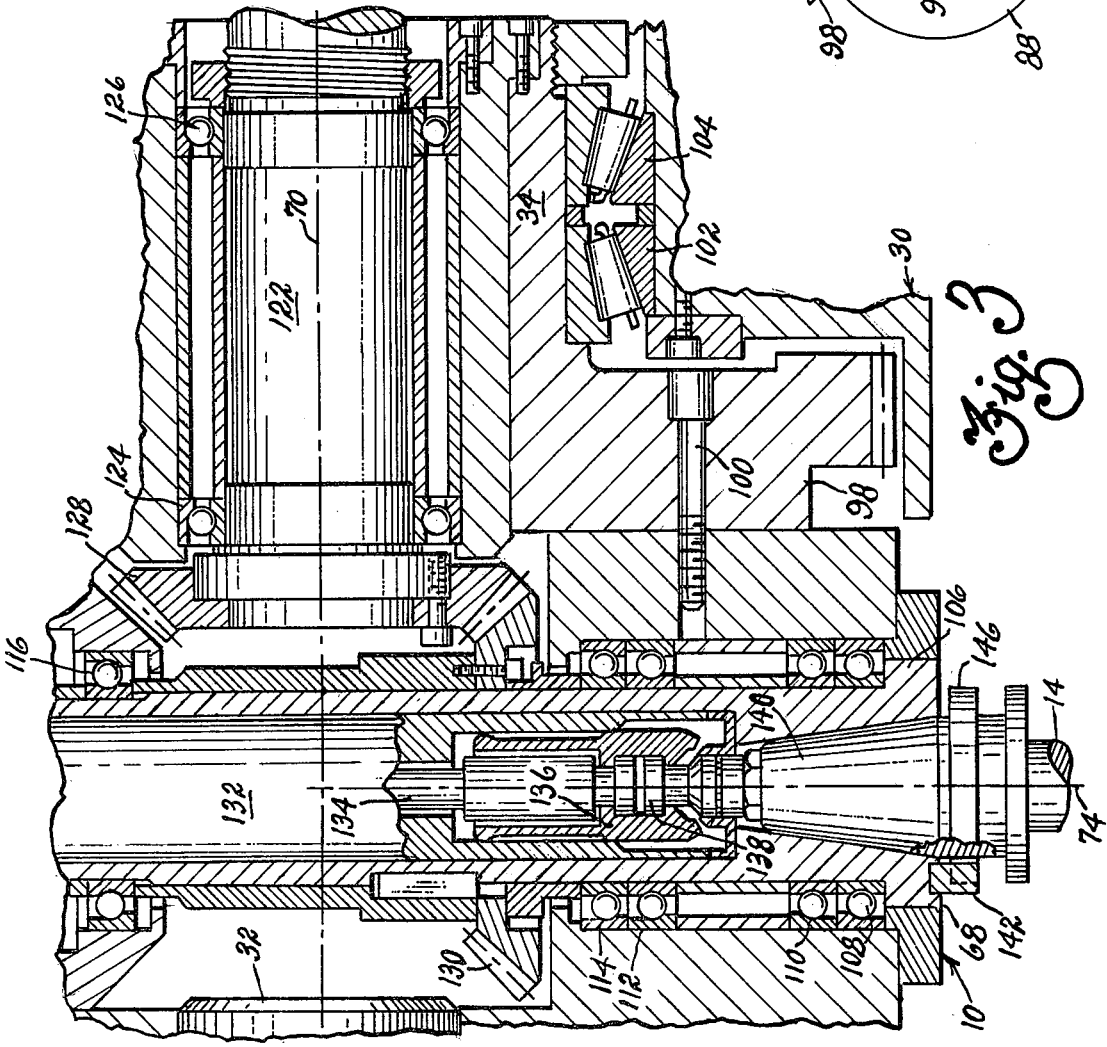
FIG. 3 is a partial section view of the spindle mechanism of the machine of FIGS. 1 and 2.

As indicated in FIG. 2 and shown in FIGS. 3 and 4, the spindle mechanism is angularly adjustable on an axis 70 when moved in the A axis mode of relative tool movement. The tool 14' in the receptacle 52 is aligned on the axis 70 and as the spindle mechanism 10 is swung, the change mechanism swings with the spindle mechanism 10 about the same axis 70 since it is mechanically attached to the spindle mechanism 10 by the bracket 71. Thus the arm 60 swings around the tool 14' in the pick-up station receptacle 52 and the end of the arm remains adjacent to this tool regardless of the angular position of the spindle mechanism 10 on the saddle structure 22 although the end of the arm 60 will move angularly around the tool 14'. In effect the change mechanism 58 is swung about the same axis 70 as is the spindle mechanism 10. The bracket 71 passes around the bearing bracket 28 in an arcuate path when this movement is made.

As can be seen in FIG. 2, the change mechanism 58 is located between the axis 70 of spindle mechanism 10 adjustment and the axis 74 on which the spindle 68 carried therein is rotatable. The axes 70 and 74 intersect. These relationships combined with the fact that the tool change mechanism swings about the same axis 70 on which the spindle mechanism 10 is angularly adjustable and thus is maintained in a location fixed relative to the spindle nose 68 and receptacle 52 permits tools to be transported by the mechanism 58 between the receptacle 52 and spindle nose 68 regardless of the angular position of the spindle mechanism 10 on the saddle structure 22 and independent of the angular adjustment of the spindle mechanism 10.

Figure 5:
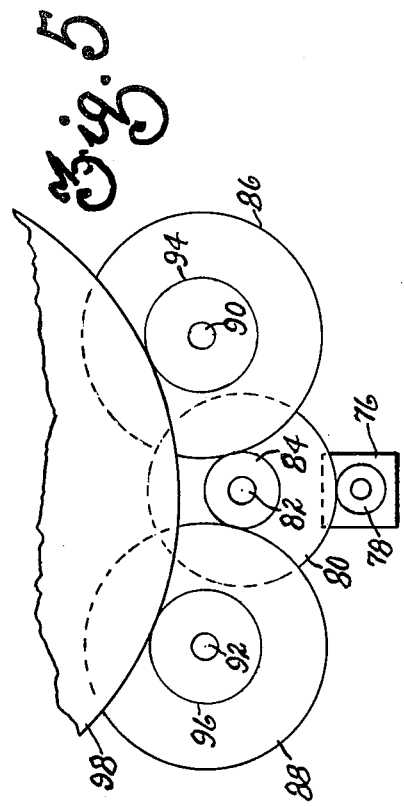
FIG. 5 is a partial schematic view of the mechanism of FIG. 4 as viewed from reference line 5—5.

As previously noted the spindle mechanism 10 is angularly adjustable about the axis 70. This movement is accomplished by means of a servo-motor that is supported on the housing 30. The schematic drawing of FIGS. 4 and 5 best show the manner of driving the spindle carrier 10 in its angular swinging motion. The motor 76 is directly connected to a worm gear 78 that drivingly engages a worm wheel 80 fixed on a shaft 82. The shaft 82 also has fixed thereon a spiral pinion 84 that engages with spiral gear wheels 86, 88 mounted on spaced shafts 90, 92. The shafts 90, 92 each carry a pinion gear 94, 96 and each of these engages a large gear wheel 98 that is integral with and concentric about the trunnion 34. The gear wheel 98 is securely attached to the side of the spindle mechanism 10 by means of machine screws 100. As shown in FIG. 3, the trunnion 34 is supported in the housing 30 by large tapered roller bearings 102, 104. All of the shafts 82, 90, 92 and the worm 78 are journalled for rotation in the housing 30 also. Selective operation of the servo-motor 76 will produce a corresponding force on the spindle mechanism 10 to cause it to be angularly moved on the saddle structure 22.

The spindle mechanism 10 has included therein a spindle member 106 that is supported in bearings 108, 110, 112, 114 and 116 so that it can be rotated on the axis 74 at a selected speed by a spindle drive motor 118. The drive motor 118 powers a transmission mechanism 120 that is selectively operable to drive an output shaft 122 at any one of a plurality of speeds. The transmission 120 and the shaft 122 are contained in the housing 30. As shown in FIGS. 3 and 4 the shaft 122 extends concentrically through the trunion 34 and gear 98 and being supported in bearings 124, 126 is rotatable independently with respect thereto. Both the trunion 34 and shaft 122 are rotatable on the same axis which is the axis 70 about which the spindle mechanism is angularly adjustable for the A axis motion.

For transmission of rotary power from the shaft 122, a pair of spiral bevel gears 128, 130 are provided. The gear 128 is fixed on the shaft 122 while the gear 130 is fixed on and is rotatable with the spindle 106. These two gears are in a one to one drive ratio. Since the gear 128 is fixed to the shaft 122 and is concentric thereon, it is also concentric about the axis 70 and the angular movement of the spindle mechanism 10 merely results in the gear 130 rolling around the gear 128 during this angular movement. There is no interference and the gears 128 and 130 remain constantly in mesh. Bevel gear 130 is, of course, concentric about the axis 74.

The spindle member 106 encloses a power draw-bar mechanism 132 which includes a reciprocating plunger 134 that operates a cam actuated gripper 136 that firmly holds the tool 14 in the spindle member 106 by applying a strong pull on an adapter knob 138 that is threaded into the tool 14. This pulls the tool 14 into the spindle 106 and holds it there so that the tapered surface 140 is firmly seated in the spindle 106. At the same time drive key 142, fixed to the spindle fits into a notch in the tool flange 146 to positively drive the tool 14. The plunger 134 when moved toward the tool 14 releases the grip on the knob 138 and permits removal of the tool 14. Insertion of a new tool 14 can be accomplished when the plunger 134 is moved to release the draw bar grip.

In order that the tool 14 can be inserted over the drive key 142, the angular position of the spindle 106 in the spindle mechanism 10 must be known at the time of a tool change by the previously described changer mechanism. As shown schematically in FIG. 4, a notched cam 148 is fixed on the shaft 122 and is engaged by a hydraulically actuated roller plunger 150. Just prior to the change of tools, the drive motor 118 is actuated to slowly rotate the elements of the transmission 120 until the plunger 150 is seated in the notched cam 148 and forcefully held there. The transmission 120 is locked against further rotation and the spindle 106 is held in a corresponding known angular position for removal and insertion of tools 14.

It must be pointed out that the known angular position of the spindle 106 in the mechanism 10 will vary in direct relationship with the position of angular adjustment of the spindle mechanism 10 on the saddle 22. This is due to the rolling action of the gear 130 on the gear 128. As can be visualized from FIGS. 1 and 2, however, as the angular position of the spindle mechanism 10 changes, the tool change mechanism 58 changes its angular position around the tool 14' in the receptacle 52. Thus the angular adjustment of the spindle mechanism 10 with its corresponding change in the angular orientation of the spindle 106 therein is directly compensated by this angular movement of the tool change mechanism around the tool 14. The two positions are kept exactly in step. As shown, the receptacle 52 is also equipped with a key so that the tool 14' is in a predetermined angular position and each of the cells 38 is similarly furnished with a key. The gripper mechanisms of the arms 48, 60 and 62 attach themselves with such force on the tools 14 so as to prevent angular shift during withdrawal transport and insertion through operation of friction forces. In this way, the angular position of the tools 14, once inserted in the magazine cells 30 is maintained at all times. The only restriction caused by angular movement of the spindle mechanism 10 is that no angular adjustment can be made during transport of the tools by the change mechanism 58.

The swing of the tool change mechanism 58 around the same axis 70 about which the spindle mechanism 10 is adjusted is the structural relationship which permits the exchange of tools in any angular position of the spindle mechanism within its range of movement. This swing of the mechanism is obtained by the construction described and the maintenance of angular tool position in spindle, storage and intermediate or pick-up station is provided by the arrangement of spindle drive and angular positioning relationships described. These all combine to provide a unique function in a four or five axis multipurpose machine tool equipped with an automatic tool changing mechanism that has not previously been available, that is, exchange of tools in any angular position of the spindle mechanism in its supporting structure.

Machines of this four and five axis configuration although not having the ability of the machine described herein, are known and commonly employed to perform machining on complex parts. This is done under direction of numerical and computer control systems and the machine described herein is also intended for such control and operation there being a control enclosure 152 for this N/C apparatus as well as the usual circuits for control of the repetitive cyclic functions and connecting cables 154 for transmission of the required power and control signals used in the various actuating mechanisms employed in the machine. Since this control apparatus and servo-mechanisms, although complex, are known in the art, for example, in U.S. Pat. No. 3,486,012 issued to Burnett, Rave, Read and Neal, for simplicity of disclosure, they are not shown in detail herein. The mechanism required for understanding the invention claimed hereinafter is shown and described in detail herein in one preferred form. It can be appreciated that changes in the specific structure can be made but so long as the relationship of the elements of the claims as recited hereinafter remain, it is, applicant's intention that such be within the scope of these claims and not departed therefrom.

What is claimed is:

1. A tool changing machine comprising in combination:
   a. a saddle member;
   b. a tool carrier supported by the saddle for angular motion around an axis extending transversely through the saddle member;
   c. an operating station in the tool carrier and having an axis of orientation, transverse to the axis of angular motion of said carrier, the operating station adapted for receipt and retention of a tool aligned on the axis of orientation;
   d. a pick-up station on the saddle member adapted to receive and hold a tool in alignment with the axis of angular motion;
   e. a transport mechanism supported on the tool carrier for rotation about an axis angularly positioned between said axes of operating station orientation and tool carrier angular motion;
   f. a means for swinging the tool carrier and transport mechanism in angular motion while maintaining the axis of rotation of the transport mechanism in a single plane with the axes of operating station orientation and tool carrier angular motion;
   g. an attachment mechanism on the transport mechanism operable to grip and release tools at the operating and pick-up stations when moved into alignment therewith; and
   h. a means for moving the transport mechanism to positions of alignment wherein said attachment mechanism engages tools in the operating and pick-up stations and for coordinating movement of the transport mechanism with operation of said attachment mechanism whereby tools are changed between the pick-up and operating stations.

2. The machine of claim 1 wherein:
   a. the tool carrier is a spindle rotatable on the axis of orientation and the tool operating station is located in an exposed end thereof;
   b. a spindle drive mechanism is supported in the saddle member;
   c. an output power shaft extends from the spindle drive mechanism and is rotatable thereby on the tool carrier angular motion axis; and
   d. a means is provided for connecting the output power shaft to the spindle for powered rotation thereof.

3. The machine of claim 2 wherein:
a. the means for connecting is a set of bevel gears, one fixed on the output power shaft concentric about the tool carrier angular motion axis and the other fixed on the spindle and concentric about the axis of orientation.

4. The machine of claim 3, wherein:
a. the bevel gears are in a one-to-one drive ratio.

5. The machine of claim 4, wherein:
a. a means is provided for stopping the rotation of the power output shaft in a predetermined angular position whereby said spindle is correspondingly stopped in a predetermined angular position.

6. The machine of claim 1, wherein:
a. the axes of tool carrier angular motion operating station orientation and transport mechanism rotation intersect at a common point.

7. The machine of claim 1, wherein:
a. the operating station includes a means for holding a tool therein in a fixed angular position relative thereto;
b. the pick-up station includes a means for holding a tool therein in a fixed angular position relative thereto, the pick-up station angular position is related directly to the operating station fixed angular position;
c. tools are insertable to be held at the pick-up and operating stations only when in angular alignment with the respective fixed angular positions thereof; and
d. the attachment mechanism includes a means for preventing angular shifting of tools gripping thereby during movement between positions effecting the change of tools between the pick-up and operating stations.

8. The machine of claim 1, wherein:
a. the transport mechanism includes a double ended arm mechanism and the axis of rotation of the transport mechanism extends therethrough at a point intermediate of the two ends thereof;
b. the attachment mechanism includes a gripper device mounted on the arm at each end thereof; and
c. said means for moving the transport mechanism moves the arm mechanism between angular positions wherein the gripper devices are positioned adjacent the operating and pick-up stations.

9. The machine of claim 8, wherein:
a. a means is provided for angularly moving the tool carrier about the axis of angular motion thereof to select positions relative to the saddle member; and
b. said means for moving the arm operates independently of the means for swinging the tool carrier and transport mechanism.

10. In a machine tool, the combination comprising:
a. a housing;
b. a first tool receptacle on the housing adapted to receive and hold a tool in alignment on a first predetermined axis;
c. an operating member supported on the housing for angular positional movement around said first predetermined axis;
d. a second tool receptacle on the operating member adapted to receive and hold a tool in alignment on a second predetermined axis, said second predetermined axis moving in a plane transverse to the first predetermined axis when the operating member is angularly moved;
e. a tool transport arm supported for rotation about a third axis intermediate to the first and second axes;
f. a means for moving the third axis in space in unison with angular movement of the operating member whereby said first, second and third axes are maintained in a fixed relationship;
g. a means on the transport arm for engaging and holding tools;
h. a means for rotating the transport arm to positions where the means for engaging tools is adjacent to said first and second receptacles, and
i. means for operating the means for engaging tools in coordination with the means for rotating the transport arm to change tools between the first and second receptacles.

11. The machine tool of claim 10 wherein said transport arm is double ended having tool engaging and holding means at each end thereof and the third axis passes centrally through the transport arm.

12. The machine tool of claim 10, wherein:
a. a means is provided for controlling the angular position of the operating member, and
b. the means for moving the third axis is a mechanical linkage between the tool transport arm and the operating member whereby the third axis and operating member move angularly in unison.

13. The machine tool of claim 10, wherein said first and second axes are perpendicular to one another and intersect.

14. In a machine tool having a compound slide structure including structural elements movable along at least two mutually perpendicular axes, the combination comprising:
a. a tool carrier attached to one of said structural elements and angularly movable around a first rotary axis extending through the one structural element;
b. an operating station in the tool carrier having an axis of orientation transverse to the first rotary axis and adapted for receipt and retention of a tool aligned on the axis of orientation;
c. a pick-up station on said one structural element located for receipt and retention of a tool aligned on the first rotary axis;
d. a tool change arm;
e. a means for supporting the tool change arm in a location between the first rotary axis and the axis of operating station orientation;
f. a means on the tool change arm operable to grip and hold tools,
g. a means for angularly positioning the tool carrier about the first rotary axis; and
h. a means for swinging said means for supporting the tool change arm in response to angular positioning of the tool carrier to maintain the location of the tool change arm in a fixed relationship with the first rotary axis and axis of operating station orientation.

15. The machine tool of claim 14, wherein:
a. the tool carrier is a spindle rotatable in the one structural element on the axis of orientation and angularly movable about the first rotary axis;
b. a drive shaft extends from the one structural element to the spindle and is rotatably supported on said first rotary axis; and
c. a means is provided for coupling the spindle to the drive shaft for rotation thereby.

16. The machine tool of claim 15 wherein:

a. a means is included in the one structural element for stopping the drive shaft in a predetermined angular position; and
b. said means for coupling the spindle to the drive shaft is a set of bevel gears having a one-to-one driving ratio whereby angular position correspondence is maintained between the spindle and drive shaft.

17. The machine tool of claim 16, wherein:
a. the operating and pick-up stations include a means for maintaining tools therein in a fixed angular position relative thereto; and
b. said means to grip and hold tools is operable to maintain a fixed angular position relative to tools when gripped and held thereby.

18. A machine tool comprising:
a. a tool pick-up station adapted to receive and hold a tool in alignment on a first axis;
b. a tool operator adapted to receive and hold a tool in alignment on a second axis intersecting the first axis;
c. a tool exchange mechanism operable to exchange tools between the pick-up station and operator and including a rotatable arm positioned between the first and second axes; and
d. a means for angularly swinging in unison the operator and the exchange mechanism in space around the first axis whereby the tool exchange mechanism is maintained between the first and second axes and the distance between the pick-up station and tool operator remains constant.

19. The machine tool of claim 18, wherein:
a. the arm is double ended and is rotatable about a third axis extending centrally therethrough;
b. the exchange mechanism is supported on a bracket connected to the tool operator; and
c. a rotary drive means is included in the exchange mechanism and is selectively operable to rotate the arm between positions where the ends of the arm are alternately positioned at the pick-up station and tool operator.

* * * * *